US011360259B2

United States Patent
Li et al.

(10) Patent No.: US 11,360,259 B2
(45) Date of Patent: Jun. 14, 2022

(54) STATIC MULTIVIEW DISPLAY WITH OFFSET LIGHT EMITTERS AND LIGHT GUIDE HAVING ARRAY OF DIFFRACTION GRATINGS

(71) Applicant: LEIA INC., Menlo Park, CA (US)

(72) Inventors: Xuejian Li, Menlo Park, CA (US); David A. Fattal, Mountain View, CA (US); Francesco Aieta, Menlo Park, CA (US); Ming Ma, Palo Alto, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 17/000,107

(22) Filed: Aug. 21, 2020

(65) Prior Publication Data

US 2020/0386937 A1    Dec. 10, 2020

Related U.S. Application Data

(63) Continuation of application No. PCT/US2018/020541, filed on Mar. 1, 2018.

(51) Int. Cl.
*G02B 6/10* (2006.01)
*F21V 8/00* (2006.01)
(Continued)

(52) U.S. Cl.
CPC ......... *G02B 6/0068* (2013.01); *G02B 6/0036* (2013.01); *G02B 27/0944* (2013.01); *G02B 27/30* (2013.01)

(58) Field of Classification Search
CPC G02B 6/0068; G02B 6/0036; G02B 27/0944; G09F 2013/1831; G09F 2013/886
See application file for complete search history.

(56) References Cited

U.S. PATENT DOCUMENTS 5,390,436 A * 2/1995 Ashall ................. G02B 6/0043
40/546
5,561,558 A   10/1996 Shiono et al.
(Continued)

FOREIGN PATENT DOCUMENTS

| WO | 2012038856 A1 | 3/2012 |
| WO | 2015016844 A1 | 5/2015 |
| WO | 2017080089 A1 | 5/2017 |

OTHER PUBLICATIONS

International Search Report and Written Opinion (ISRWO) from the International Searching Authority (ISA/KR) dated Nov. 22, 2018 (14 pages) for counterpart parent PCT Application No. PCT/US2018/020541.

(Continued)

*Primary Examiner* — Ismael Negron
(74) *Attorney, Agent, or Firm* — J. Michael Johnson

(57) ABSTRACT

A static multiview display includes a plurality of light emitters offset in a longitudinal direction; a light guide configured to guide light in the longitudinal direction; a collimating light coupler configured to receive light from the light emitters and coupling the light to the light guide; and an array of diffraction gratings to extract light guided by the light guide to provide a multiview image having a direction that is a function of both color and a propagation angle of light guided by the light guide.

19 Claims, 14 Drawing Sheets

(51) Int. Cl.
*G02B 27/09* (2006.01)
*G02B 27/30* (2006.01)

(56) References Cited

U.S. PATENT DOCUMENTS

| | | | | |
|---|---|---|---|---|
| 6,539,656 | B2* | 4/2003 | Maas | G02B 6/0036 |
| | | | | 40/546 |
| 8,807,817 | B2* | 8/2014 | Yang | G02B 6/0076 |
| | | | | 362/606 |
| 9,201,270 | B2 | 12/2015 | Fattal et al. | |
| 9,298,168 | B2 | 3/2016 | Taff et al. | |
| 9,389,415 | B2 | 7/2016 | Fattal et al. | |
| 9,459,461 | B2* | 10/2016 | Santori | G02B 6/0068 |
| 9,557,466 | B2* | 1/2017 | Fattal | G02B 6/0068 |
| 9,612,390 | B2* | 4/2017 | Thompson | G02B 6/0038 |
| 9,785,119 | B2 | 10/2017 | Taff et al. | |
| 9,903,996 | B2* | 2/2018 | Fukui | G09F 13/14 |
| 10,345,505 | B2 | 7/2019 | Fattal | |
| 10,371,349 | B2 | 8/2019 | Kitamura et al. | |
| 10,429,567 | B2* | 10/2019 | Wan | G02B 6/0068 |
| 10,459,147 | B2 | 10/2019 | Ma et al. | |
| 10,578,793 | B2 | 3/2020 | Baldwin et al. | |
| 10,690,830 | B2* | 6/2020 | Takagi | G02B 6/0036 |
| 10,725,226 | B2* | 7/2020 | Fattal | G02B 6/0068 |
| 10,969,532 | B2 | 4/2021 | Fattal | |
| 2005/0122743 | A1 | 6/2005 | Lin | |
| 2005/0213348 | A1 | 9/2005 | Parikka et al. | |
| 2009/0091837 | A1 | 4/2009 | Chao et al. | |
| 2009/0207342 | A1 | 8/2009 | Yamaguchi et al. | |
| 2010/0141868 | A1 | 6/2010 | St. Hilaire et al. | |
| 2011/0002143 | A1 | 1/2011 | Saarikko et al. | |
| 2011/0141395 | A1 | 6/2011 | Yashiro | |
| 2012/0008067 | A1 | 1/2012 | Mun et al. | |
| 2012/0113678 | A1 | 5/2012 | Cornelissen et al. | |
| 2013/0100695 | A1 | 4/2013 | Yankov et al. | |
| 2014/0043847 | A1 | 2/2014 | Yang et al. | |
| 2015/0003106 | A1 | 1/2015 | Thompson et al. | |
| 2015/0036068 | A1 | 2/2015 | Fattal et al. | |
| 2016/0018582 | A1* | 1/2016 | Fiorentino | G02B 6/002 |
| | | | | 362/609 |
| 2016/0033705 | A1 | 2/2016 | Fattal | |
| 2016/0033784 | A1 | 2/2016 | Levola et al. | |
| 2017/0299793 | A1 | 10/2017 | Fattal | |
| 2017/0299794 | A1 | 10/2017 | Fattal | |
| 2018/0172893 | A1 | 6/2018 | Fattal et al. | |
| 2018/0321500 | A1 | 11/2018 | Chen et al. | |
| 2019/0170926 | A1 | 6/2019 | Fattal et al. | |
| 2019/0196091 | A1 | 6/2019 | Li et al. | |
| 2020/0074895 | A1* | 3/2020 | Liang | G02B 6/0076 |
| 2020/0150322 | A1* | 5/2020 | Lin | G02B 6/0068 |
| 2020/0218011 | A1 | 7/2020 | Li et al. | |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

* cited by examiner

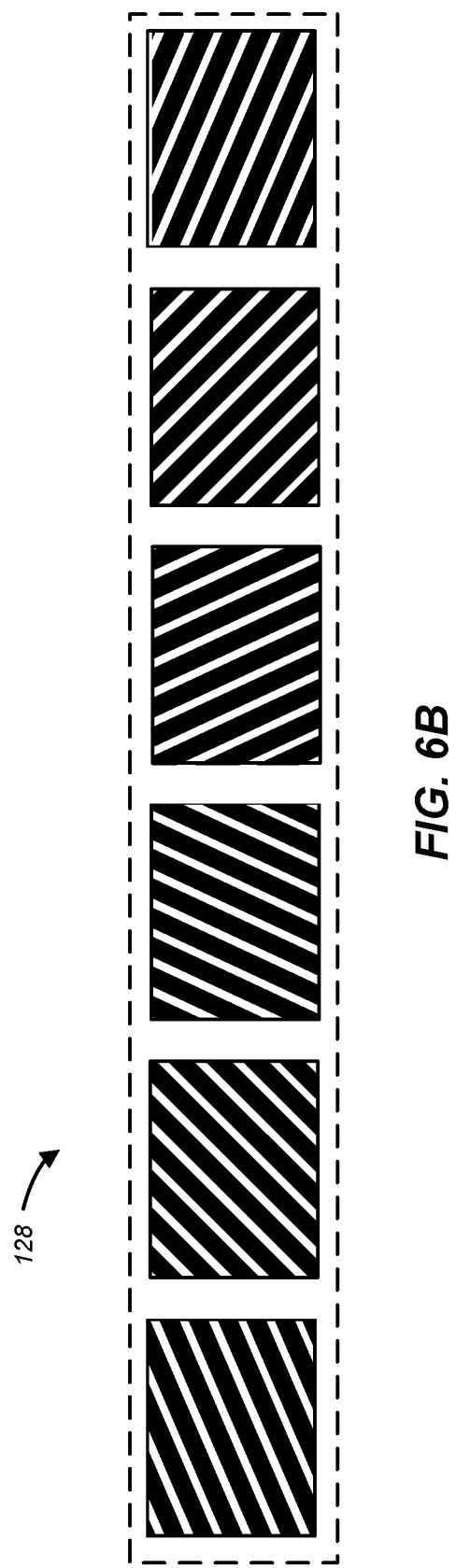

STATIC MULTIVIEW DISPLAY WITH OFFSET LIGHT EMITTERS AND LIGHT GUIDE HAVING ARRAY OF DIFFRACTION GRATINGS

CROSS-REFERENCE TO RELATED APPLICATIONS

This application is a continuation application of and claims priority to International Patent Application No. PCT/US2018/020541, filed Mar. 1, 2018, which is incorporated by reference in its entirety herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Generally, electronic displays may be categorized as either active displays (i.e., displays that emit light) or passive displays (i.e., displays that modulate light provided by another source). Passive displays, while often exhibiting attractive performance characteristics including, but not limited to, inherently low power consumption, may find somewhat limited use in many practical applications given the lack of an ability to emit light. In order to overcome the limitations of passive displays associated with emitted light, many passive displays are coupled to an external light source, such as a backlight.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 4A:
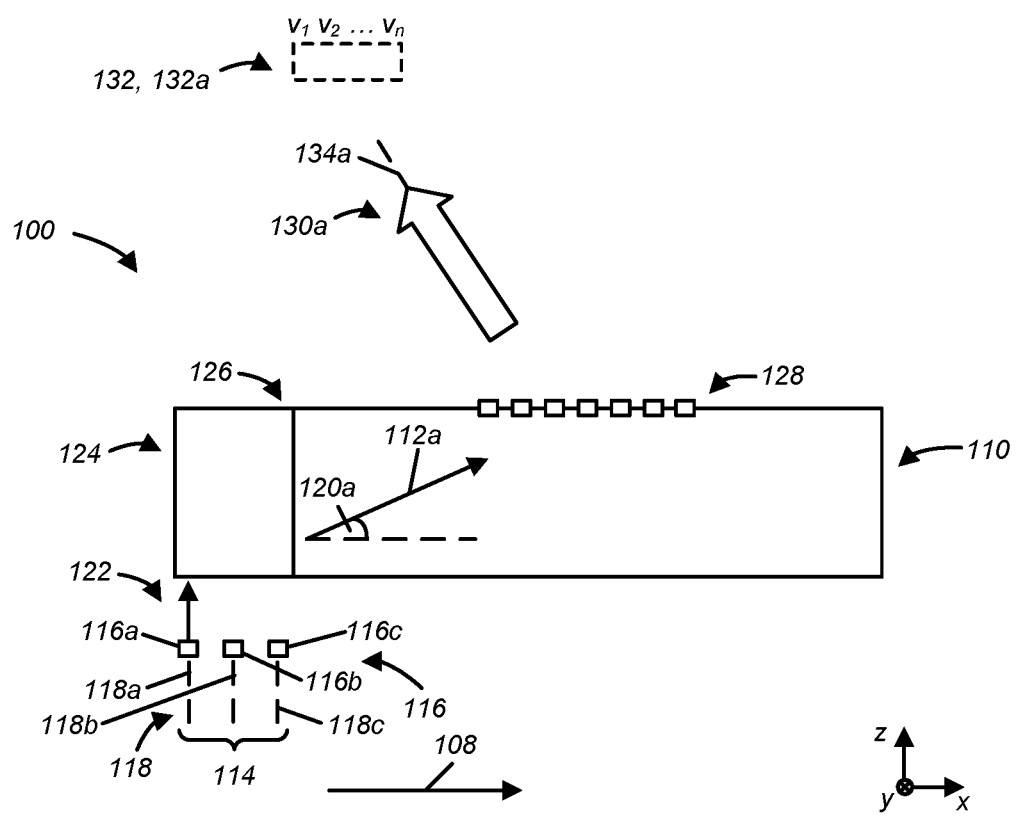
FIG. 4A illustrates a cross-sectional view of a static multiview display in an example, according to an embodiment consistent with the principles described herein.
Figure 4B:
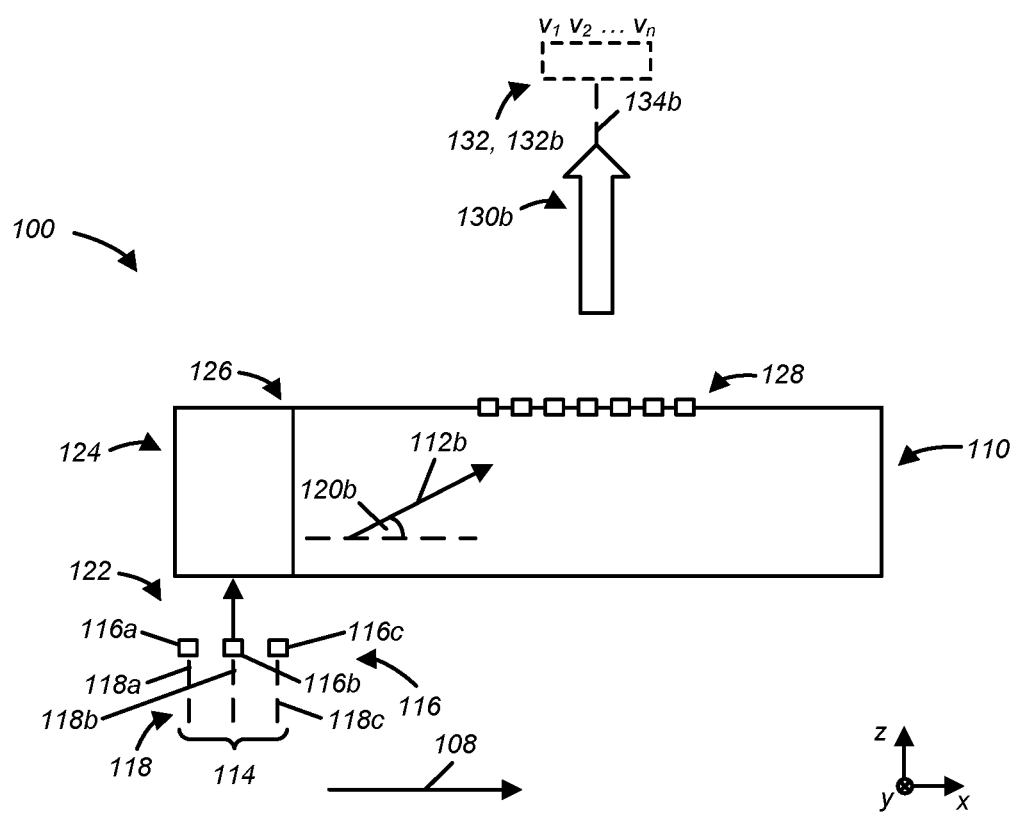
FIG. 4B illustrates a cross-sectional view of a static multiview display in an example, according to an embodiment consistent with the principles described herein.
Figure 4C:
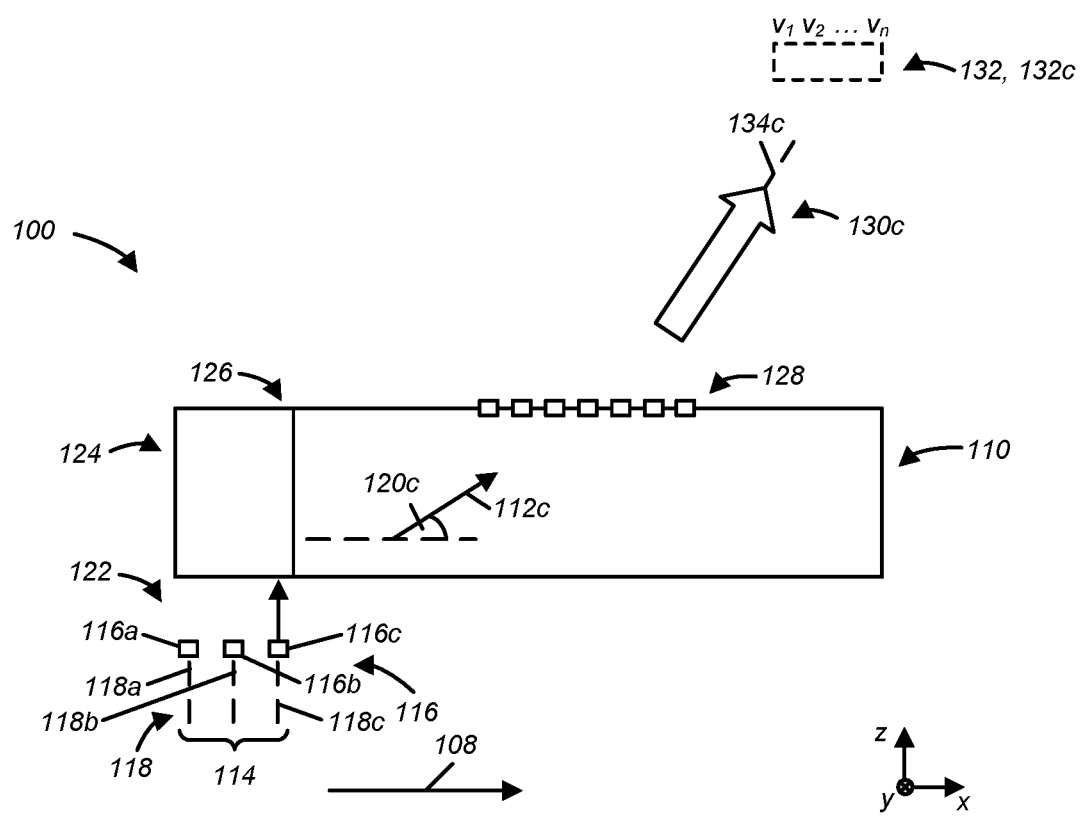

The FIG. 4C illustrates a cross-sectional view of a static multiview display in an example, according to an embodiment consistent with the principles described herein.

Figure 5:
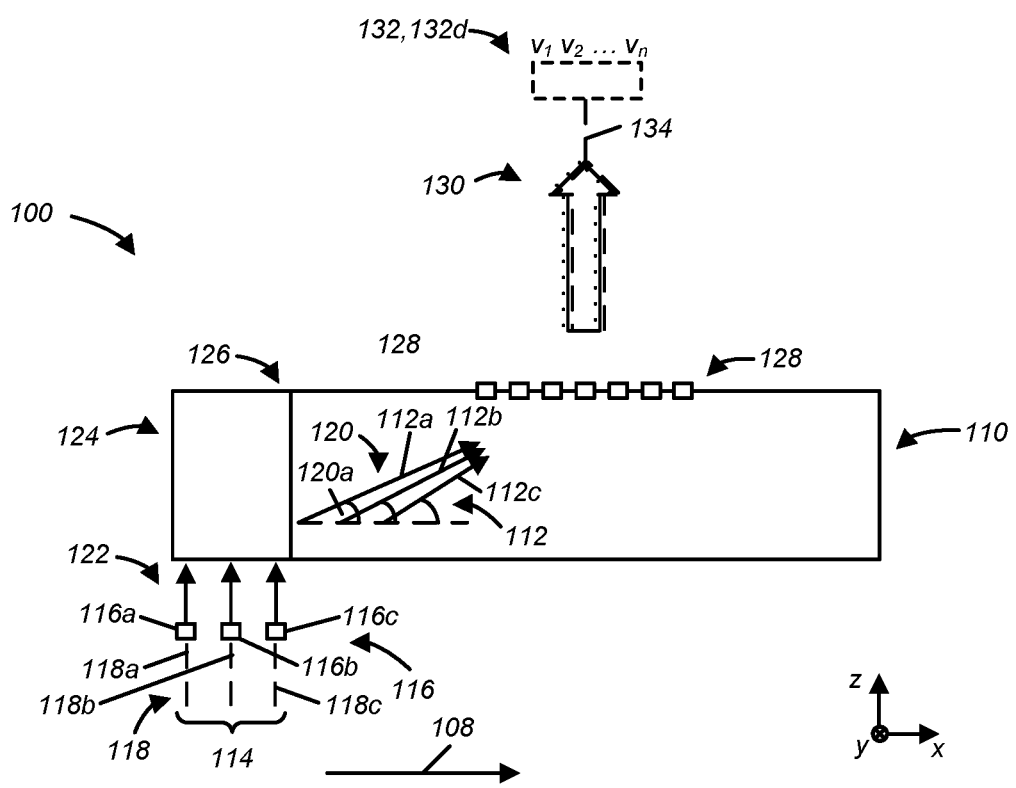

FIG. 5 illustrates a cross-sectional view of a multiview display in an example, according to an embodiment consistent with the principles described herein.

Figure 6A:
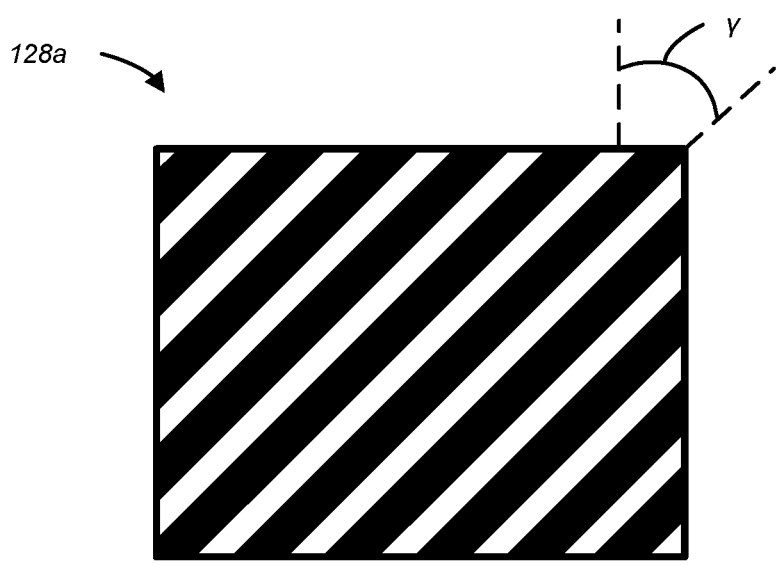

FIG. 6A illustrates a top view of a diffraction grating in an example, according to an embodiment consistent with the principles described herein.

FIG. 6B illustrates a top view of a plurality of diffraction gratings 128 in an example, according to another embodiment consistent with the principles described herein.

Figure 7A:
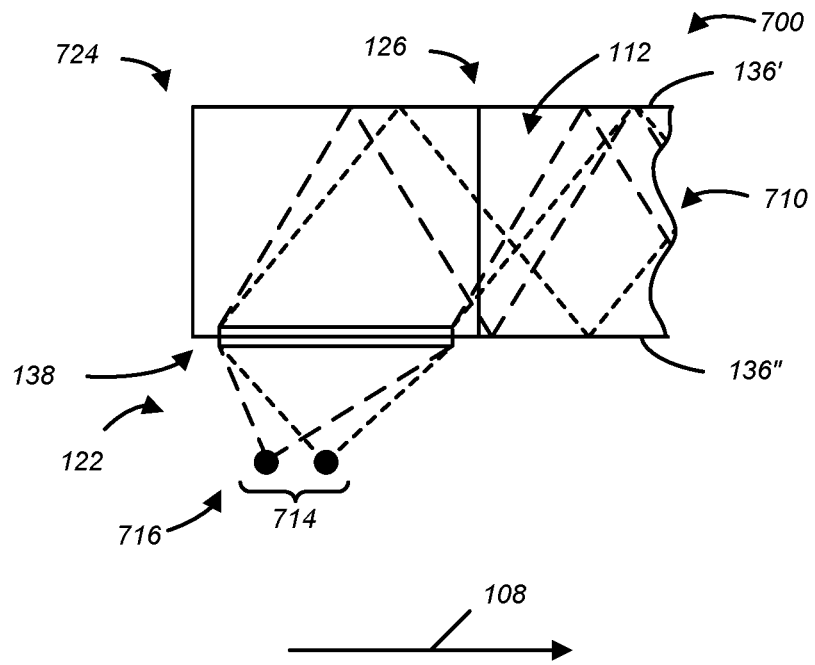

FIG. 7A illustrates a cross-sectional view of a collimating light coupler comprising a cylindrical grating coupler in an example, according to an embodiment consistent with the principles described herein.

Figure 7B:
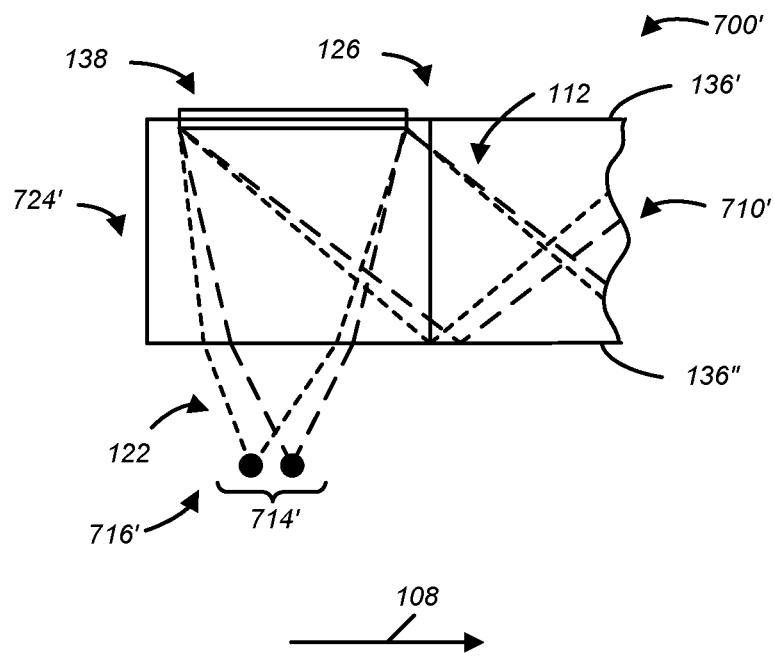

FIG. 7B illustrates a cross-sectional view of a collimating light coupler comprising a cylindrical grating coupler in an example, according to another embodiment consistent with the principles described herein.

Figure 7C:
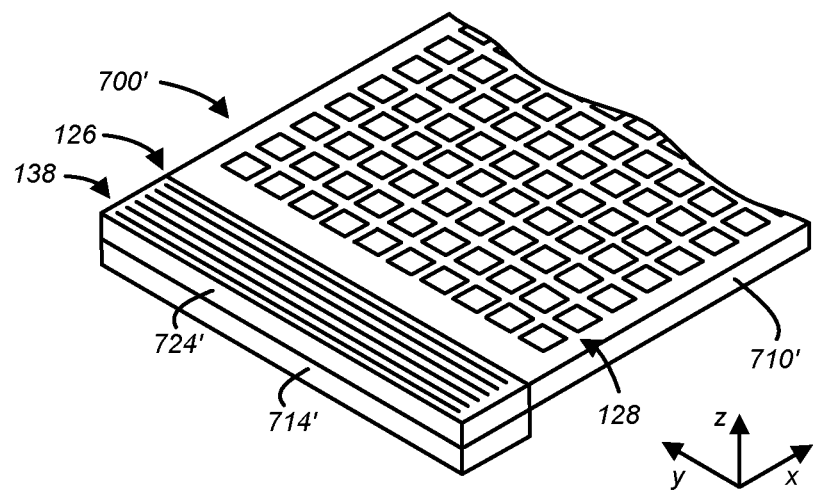

FIG. 7C illustrates a perspective view of the collimating light coupler of FIG. 7B in an example, according to an embodiment consistent with the principles described herein.

Figure 8A:
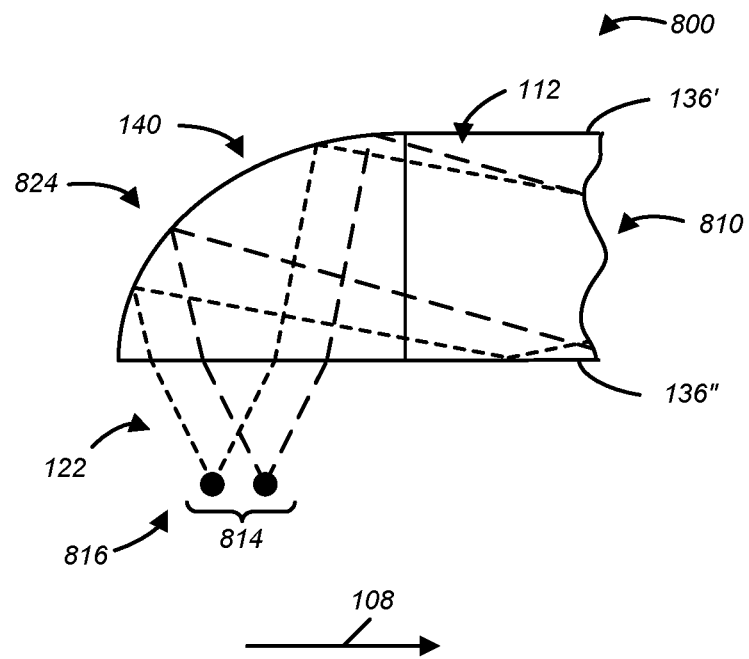

FIG. 8A illustrates a cross-sectional view of a collimating light coupler comprising a parabolic reflective coupler in an example, according to an embodiment consistent with the principles described herein.

Figure 8B:
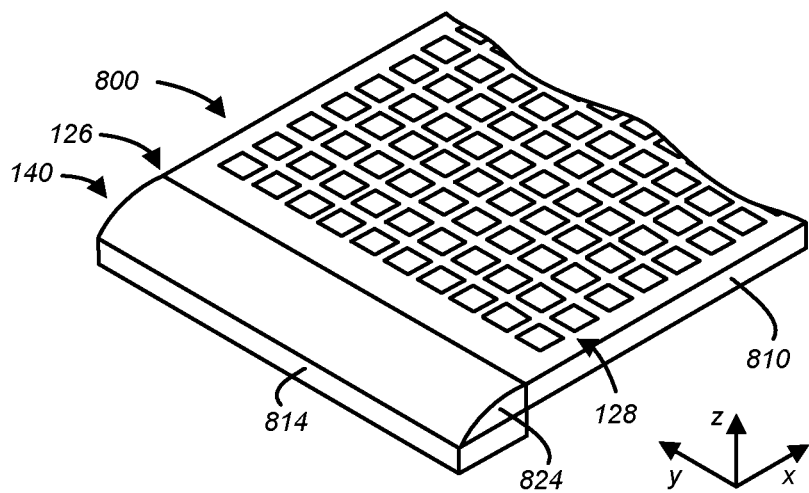

FIG. 8B illustrates a perspective view of a collimating light coupler comprising parabolic reflective coupler in an example, according to an embodiment consistent with the principles described herein.

Figure 9:
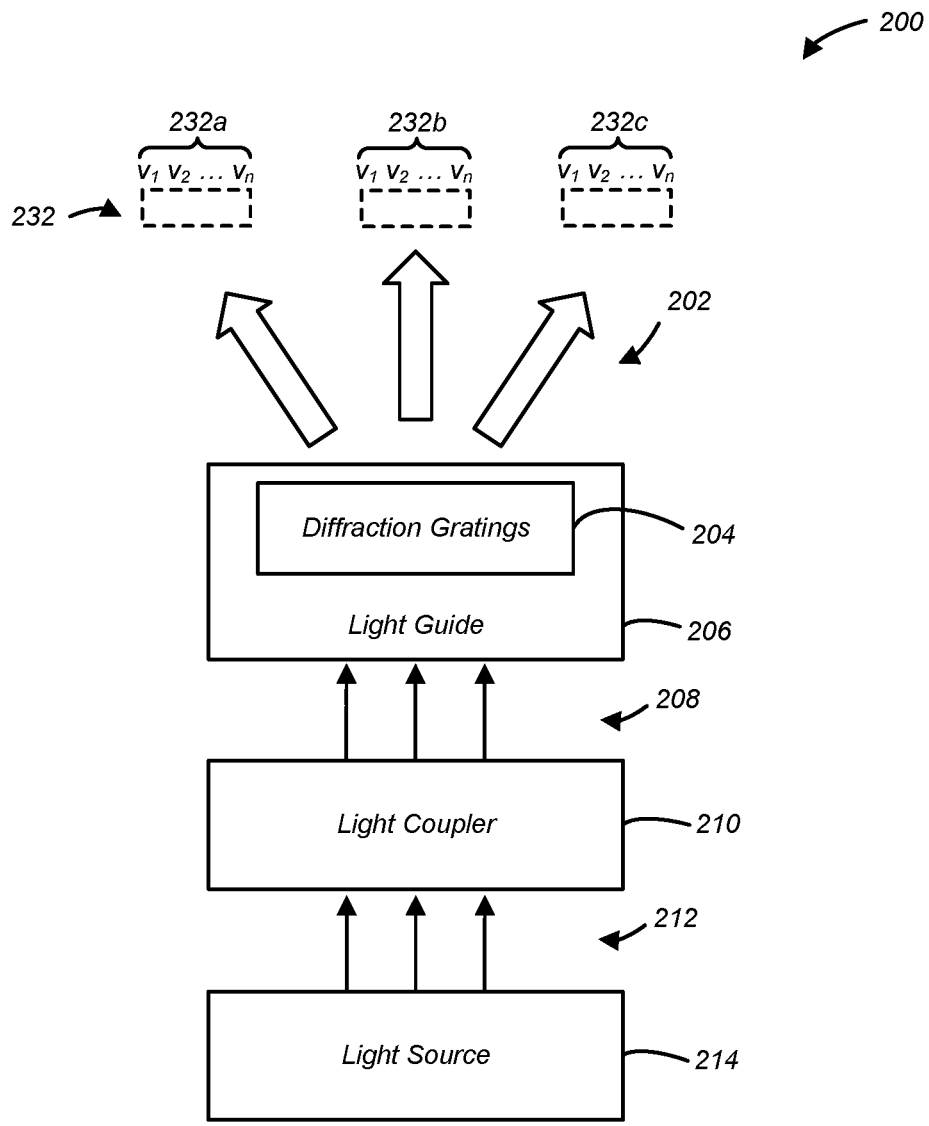

FIG. 9 illustrates a block diagram of a transparent static multiview display in an example, according to an embodiment consistent with the principles described herein.

Figure 10:
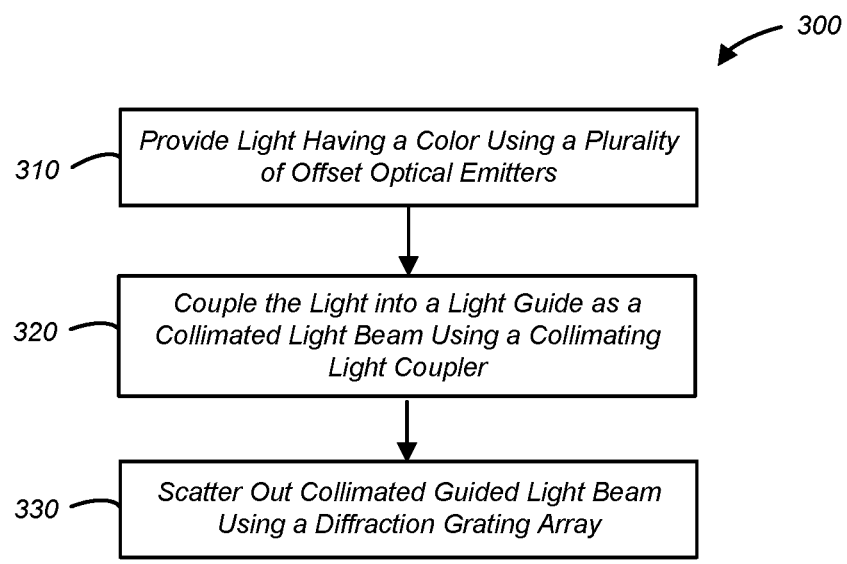

FIG. 10 illustrates a flow chart of a method of static multiview display operation in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a static multiview display configured to emit directional light beams representing a multiview image or three-dimensional (3D) image. In particular, embodiments consistent with the principles described herein provide a multiview display having a light guide that guides light in a longitudinal direction from a light source. The light source includes a plurality of optical emitters offset from one another in the longitudinal direction. An optical emitter of the light source provides within the light guide a collimated guided light beam having a propagation angle determined by a longitudinal offset of the optical emitter. Moreover, an array of diffraction gratings scatters or diffracts out a portion of the collimated guided light beam as a plurality of directional light beams representing the multiview image, where a direction of the multiview image is a function of both a color and the propagation angle of the collimated guided light beam. According to various embodiments, a diffraction grating of the diffraction grating array provides a directional light beam of the plurality of directional light beams having an intensity and a principal angular direction corresponding to an intensity and a view direction of a view pixel of the multiview image.

According to various embodiments, a grating characteristic of each of the diffraction gratings of the diffraction grating array may be configured to determine the intensity and the principal angular direction of the directional light beam provided by the diffraction grating. In particular, grating characteristics configured to determine the principal angular direction of the provided directional light beam may include one or both of a grating pitch or feature spacing of the diffraction grating and a grating orientation of the diffraction grating. Similarly, grating characteristics configured to determine intensity of the directional light beam may include one or both of a grating depth and a grating size (such as a length or width).

In some embodiments, the diffraction gratings may be located on a same surface as an emission surface of the light guide through which the portion of the collimated guided light beam is scattered out as the plurality of directional light beams. Alternatively, the diffraction gratings may be located on a surface of the light guide opposite to the emission surface of the light guide, in other embodiments. In some embodiments, the light guide and the array of diffraction gratings are transparent to light propagating in a vertical direction orthogonal the longitudinal direction.

Further, in some embodiments, the static multiview display may include a collimating light coupler or equivalently a collimating optical coupler at input of the light guide. The collimating light coupler optically couples light from the optical emitters of the light source into the light guide input as the collimated guided light beams, wherein the longitudinal offset of an optical emitter is a location of the optical emitter in the longitudinal direction relative to the collimating light coupler. For example, the collimating light coupler may include a cylindrical grating coupler. The cylindrical grating coupler may comprise one or both of a reflection-mode diffraction grating or a transmission-mode diffraction grating, for example. In other examples, the collimating light coupler may comprise another collimating coupler such as, but not limited to, a collimating reflector (e.g., a tilted parabolic reflector coupler).

According to various embodiments, the plurality of directional light beams having intensities and principal angular directions emitted by the static multiview display may be configured to provide or display one or more multiview images. In some embodiments, the static multiview images may be provided as a quasi-static multiview image. For example, the optical emitters of the light source may have different longitudinal offsets from one another that provide collimated guided light beams at different propagation angles. The different propagation angles may result in the multiview images having different directions from one another. By selectively activating the optical emitters having the different longitudinal offsets, the static multiview display may be configured to switch between the multiview images having the different directions, thereby providing animation of the multiview images. Consequently, in these embodiments, the static multiview display may be quasi-static in that a quasi-static or animated multiview image is provided. In other embodiments, the optical emitters of the light source may include optical emitters having different colors with longitudinal offsets selected so that the provided multiview images corresponding to the different colors combine as a composite multiview image. The composite multiview image has a color representing a combination of the different colors and relative illumination intensities of the different optical emitters.

Herein, a 'multiview display' is defined as an electronic display or display system configured to provide different views of a multiview image in different view directions. A 'static multiview display' is a defined as a multiview display configured to display a predetermined or fixed (i.e., static) multiview image, albeit as a plurality of different views. A 'quasi-static multiview display' is defined herein as a static multiview display that may be switched between different fixed multiview images or between a plurality of multiview image states, typically as a function of time. Switching between the different fixed multiview images or multiview image states may provide a rudimentary form of animation, for example. Further, as defined herein, a quasi-static multiview display is a type of static multiview display. As such, no distinction is made between a purely static multiview display or image and a quasi-static multiview display or image, unless such distinction is necessary for proper understanding.

Further, herein a 'color' multiview image is defined as a multiview image having a particular or predefined color. In some embodiments, the predefined color may be selectable. That is, the predefined color may be chosen during operation and further may be changeable as a function of time. For example, during a first time interval the color of the color multiview image may be selected to be or comprise a first color, while the color of the color multiview image may be selected to be or comprise a second color at or during a second time interval. Color selection may be provided by a color-selectable or color-controllable multicolor light source (i.e., a color light source in which a color of provided light is controllable), for example.

Figure 1A:
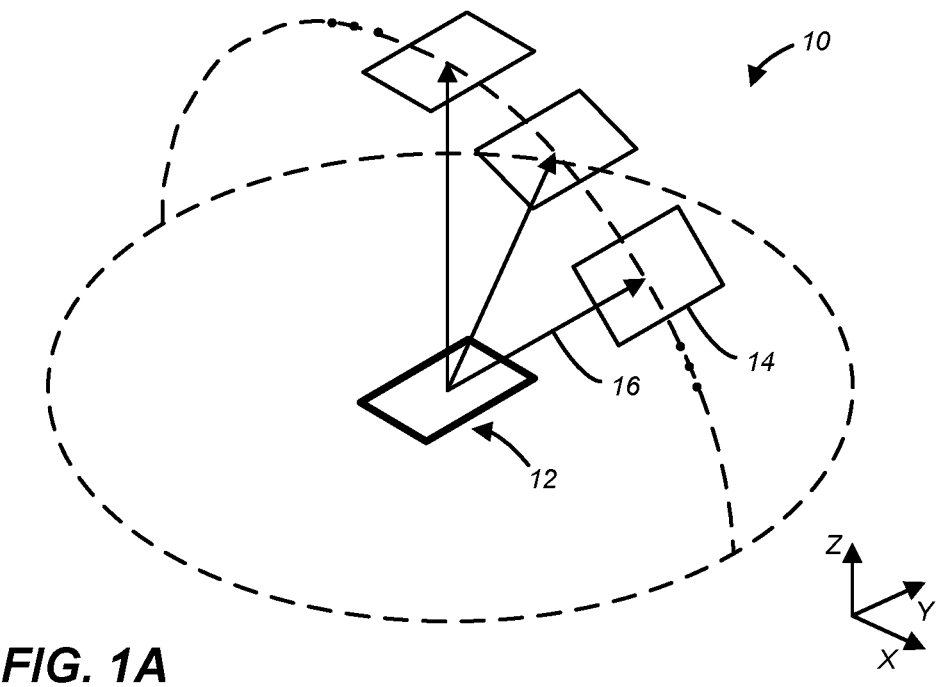
FIG. 1A illustrates a perspective view of a multiview display in an example, according to an embodiment consistent with the principles described herein.

FIG. 1A illustrates a perspective view of a multiview display 10 in an example, according to an embodiment consistent with the principles described herein. As illustrated in FIG. 1A, the multiview display 10 comprises a diffraction grating on a screen 12 to display view pixels in views 14 in a multiview image. The multiview image may have a selectable color and therefore may be a color multiview image, for example. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view or principal angular directions 16 relative to the diffraction grating on the screen 12. The view directions 16 are illustrated as arrows extending from the screen 12 in various different principal angular directions; the different views 14 are illustrated as polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen 12, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. Similarly, while views 14 are depicted along an arc around the y-axis (i.e., in the x-z plane), this is also for simplicity of illustration and is not intended to be limiting.

Figure 1B:
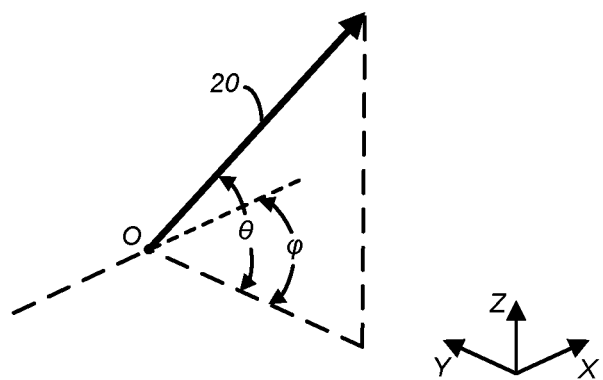
FIG. 1B illustrates a graphical representation of angular components of a light beam having a particular principal angular direction corresponding to a view direction of a multiview display in an example, according to an embodiment consistent with the principles described herein.

A view direction or equivalently a light beam having a direction corresponding to a view direction of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane). FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

In the multiview display, each of the diffraction gratings in the plurality of the diffraction gratings may constitute a view pixel in the multiview image. In particular, each of the diffraction gratings may provide a light beam (having an intensity and a principal angular direction) that represents a view pixel in a particular view of a multiview image provided by the multiview display. Thus, in some embodiments, each of the diffraction gratings may provide a light beam that contributes to a view of the multiview image. In some embodiments, the multiview display includes 640×480 or 307,200 diffraction gratings. In other embodiments, the multiview display includes 100×100 or 10,000 diffraction gratings.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner having one or more grating spacings between pairs of the features. For example, the diffraction grating may comprise a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. According to various embodiments and examples, the diffraction grating may be a sub-wavelength grating having a grating spacing or distance between adjacent diffractive features that is less than about a wavelength of light that is to be diffracted by the diffraction grating.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure comprising diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

As described further below with reference to FIGS. 6A and 6B, a diffraction grating herein may have a grating characteristic, including one or more of a feature spacing or pitch, an orientation and a size (such as a width or length of the diffraction grating). As described further below with reference to FIGS. 3A-5, selection of the grating characteristic may be, at least in part, a function of the propagation angle of collimated guided light beams, a color of the collimated guided light beams or both. For example, the grating characteristic of a diffraction grating may depend on a longitudinal offset of an optical emitter in the light source and a location of the diffraction grating. By appropriately varying the grating characteristic of the diffraction grating, an intensity and a principal angular direction of a light beam diffracted by the diffraction grating (which is sometimes referred to as a 'directional light beam') corresponds to an intensity and a view direction of a view pixel of the multiview image.

According to various examples described herein, a diffraction grating (e.g., a diffraction grating of a multiview display, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light (which corresponds to its color), m is a diffraction order, n is an index of refraction of a light guide, d is a distance or spacing between features of the diffraction grating, $\theta_i$ is an angle of incidence of light on the diffraction grating (i.e., the propagation angle). For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
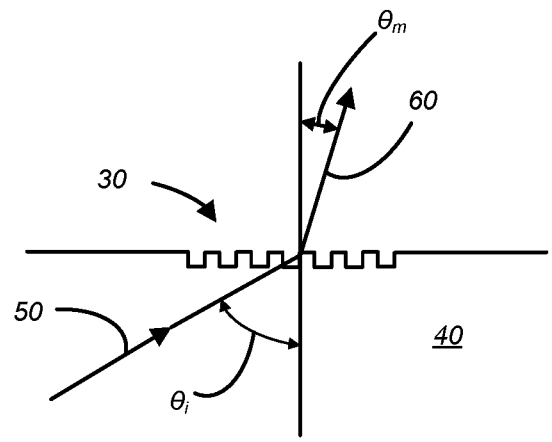
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam (or a collection of light beams) 50 incident on the diffraction grating 30 at an incident angle $\theta_i$. The light beam 50 is a collimated guided light beam within the light guide 40. Also illustrated in FIG. 2 is a coupled-out light beam (or a collection of light beams) 60 diffractively produced and coupled-out by the diffraction grating 30 as a result of diffraction of the incident light beam 50. The coupled-out light beam 60 has a diffraction angle $\theta_m$ (or 'principal angular direction' herein) as given by equation (1). The coupled-out light beam 60 may correspond to a diffraction order 'm' of the diffraction grating 30, for example.

According to various embodiments, the principal angular direction of the various light beams is determined by the grating characteristic including, but not limited to, one or more of a size (e.g., a length, a width, an area, etc.) of the diffraction grating, an orientation, a feature spacing, and a grating depth. Further, a light beam produced by the diffraction grating has a principal angular direction given by angular components $\{\theta, \phi\}$, by definition herein, and as described above with respect to FIG. 1B.

As described further below with reference to FIGS. 3A-5, the multiview display may be based on the ability to couple out light from a light guide and, in particular, to steer a directional light beam in a principal angular direction using a diffraction grating at a particular location on the light guide. A single directional light beam from a diffraction grating (having an intensity and a principal angular direction) represents a view pixel in a particular view of a multiview display. The diffraction grating on the light guide is effectively an angle preserving coupling structure in which the angle of emission relative to the angle of incidence is determined by the grating equation, i.e., equation (1). Thus, a single monochromatic light beam incident to the diffraction grating may produce or output a single directional light beam for a particular diffraction order of the diffraction grating.

In some embodiments, the guided light in the light guide is at least partially collimated along the longitudinal direction, the vertical direction or both. For example, the light source may provide at least partially collimated light, the light guide may, at least in part, collimate the guided light, and/or the multiview display may comprise a collimator. Thus, in some embodiments, one or more components in the multiview display performs the function of a collimator.

Herein, a 'collimated light' or 'collimated light beam' is generally defined as a beam of light in which rays of the light beam are substantially parallel to one another within the light beam (e.g., the collimated guided light beam in the light guide). Further, rays of light that diverge or are scattered from the collimated light beam are not considered to be part of the collimated light beam, by definition herein. Moreover, herein a 'collimator' or 'collimating light coupler' is defined as substantially any optical device or apparatus that is configured to collimate light and coupler the collimated light into a light guide. For example, a collimator (e.g., a collimating light coupler) may include, but is not limited to, a collimating mirror or reflector, a collimating lens, a collimating diffraction grating, and various combinations thereof. In some embodiments, the collimator comprising a collimating reflector may have a reflecting surface characterized by a parabolic curve or shape. As described further below with reference to FIGS. 8A and 8B, in another example the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., one or more optical emitters configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a diffraction grating' means one or more diffraction gratings and as such, 'the diffraction grating' means 'the diffraction grating(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3A:
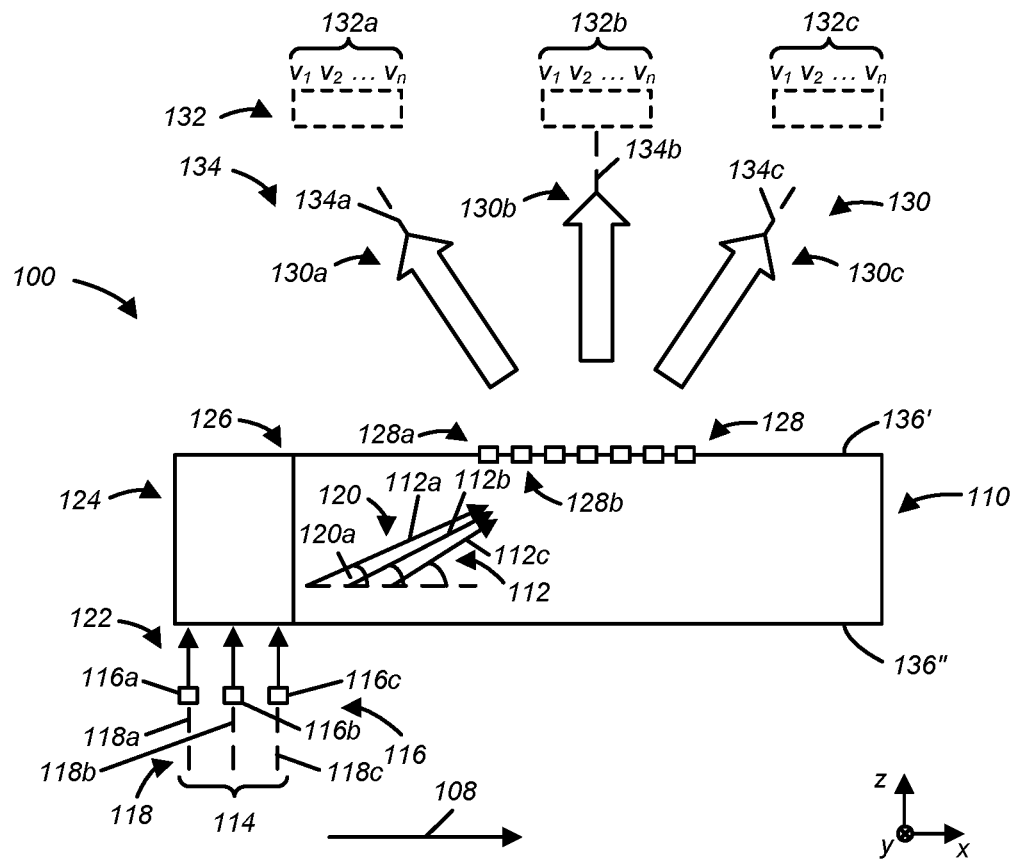
FIG. 3A illustrates a cross-sectional view of a static multiview display in an example, according to an embodiment consistent with the principles described herein.
Figure 3B:
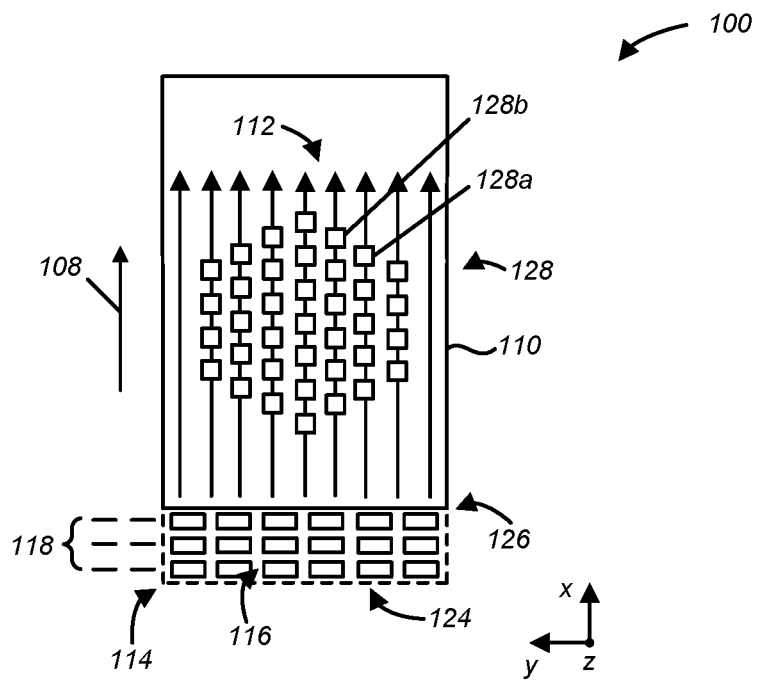
FIG. 3B illustrates a top view of a static multiview display in an example, according to an embodiment consistent with the principles described herein.
Figure 3C:
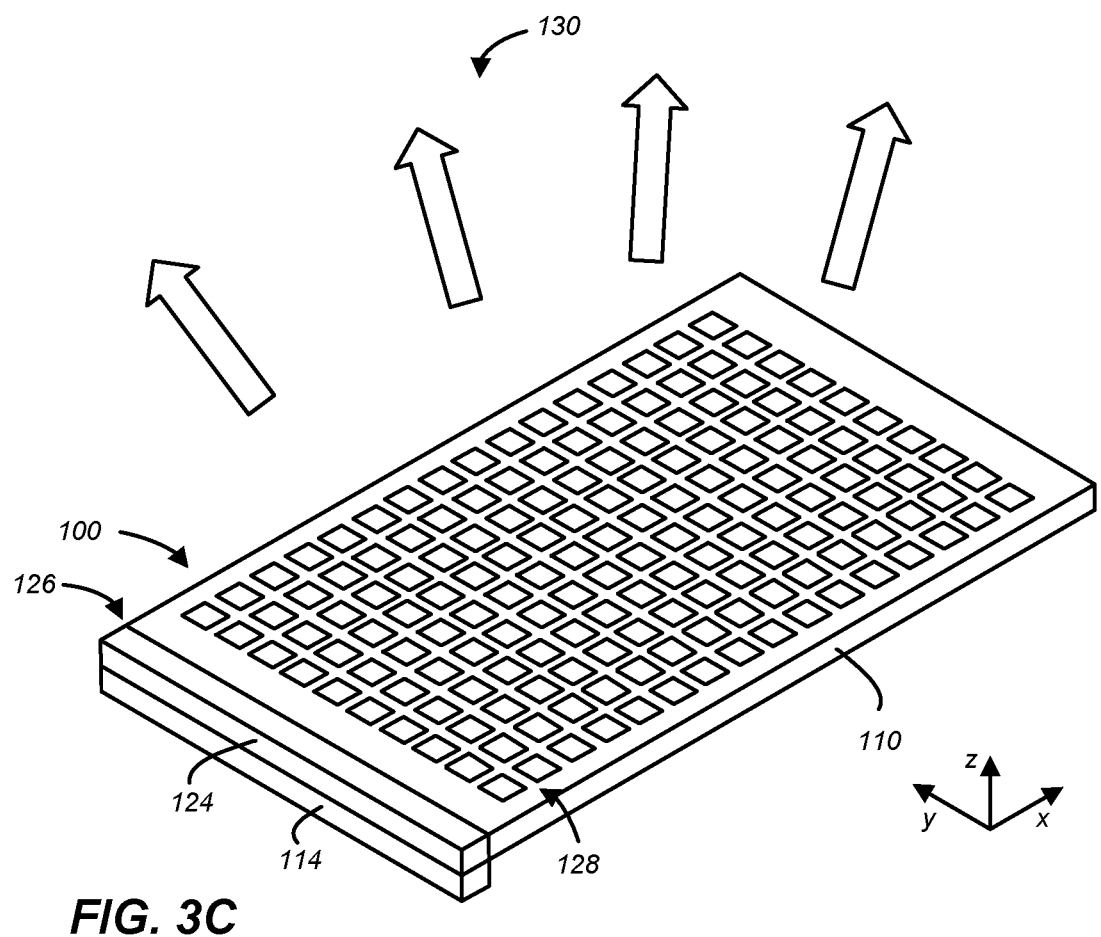
FIG. 3C illustrates a perspective view of a static multiview display in an example, according to an embodiment consistent with the principles described herein.

According to some embodiments of the principles described herein, a static multiview display is provided. The static multiview display is configured to provide multiview image, according to various embodiments. FIG. 3A illustrates a cross-sectional view of a static multiview display 100 in an example, according to an embodiment consistent with the principles described herein. FIG. 3B illustrates a top view of a static multiview display 100 in an example, according to an embodiment consistent with the principles described herein. FIG. 3C illustrates a perspective view of a static multiview display 100 in an example, according to an embodiment consistent with the principles described herein.

As illustrated, the static multiview display 100 comprises a light guide 110, such as a plate light guide. The light guide 110 is configured to guide light along a longitudinal direction 108 within the light guide 110. Further, the light is guided by the light guide 110 in the longitudinal direction 108 as a collimated guided light beam 112 (such as collimated guided light beams 112a, 112b and 112c). For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the collimated guided light beams 112 according to one or more guided modes of the light guide 110, for example. Note that the longitudinal direction 108 may define a general or net propagation direction of the collimated guided light beams 112. As illustrated, the longitudinal direction 108 is an 'x-direction' or along an x-axis. Further the collimated guided light beam 112 is collimated according to a collimation factor in a vertical direction, i.e., in an x-z plane, as illustrated.

In some embodiments, the light guide 110 may be a slab or plate optical waveguide comprising an extended, substantially planar sheet of optically transparent, dielectric material. The substantially planar sheet of dielectric material is configured to guide the collimated guided light beam 112 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

The multiview display 100, illustrated in FIGS. 3A-3C, further comprises a light source 114 configured to provide light 122. The light source 114 comprises a plurality of optical emitters 116 (such as optical emitters 116a, 116b and 116c) that are offset from one another by longitudinal offsets 118 in the longitudinal direction 108. In addition, the optical emitters 116 of the light source 114 are optically coupled to the light guide 110 (e.g., by a collimating light coupler 124, described below), according to various embodiments.

In various embodiments, an optical emitter 116 of the optical emitter plurality of the light source 114 is configured to provide within the light guide 110 a collimated guided light beam 112 having a propagation angle 120 determined by a longitudinal offset 118 of the optical emitter 116. For example, a first optical emitter 116a may have a first longitudinal offset 118a, a second optical emitter 116b may have a second longitudinal offset 118b, and a third optical emitter 116c may have a third longitudinal offset 118c. The first longitudinal offset 118a is configured to determine a first propagation angle 120a of a first collimated guided light beam 112a provided by the first optical emitter 116a within the light guide 110. Similarly, the second and third longitudinal offsets 118b, 118c are configured to determine a respective second propagation angle 120b and third propagation angle 120c of collimated guided light beams 112b, 112c provided within the light guide 110 respectively by the second and third optical emitters 116*b*, 116*c*. According to various embodiments, the light source 114 may be located adjacent to an entrance surface or input end 126 of the light guide 110. The optical emitters 116 may provide the light 122 that is coupled into the light guide 110 (e.g., by the collimating light coupler 124), such that the collimated guided light beams 112 have the propagation angles 120 and further such that the collimated guided light beams 112 generally propagate away from the input end 126 along the longitudinal direction 108 (i.e., along the x-axis in FIG. 3A).

In various embodiments, the light source 114 and more particularly the plurality of optical emitters 116 may comprise substantially any source of light including, but not limited to, one or more light emitting diodes (LEDs) or a laser (e.g., laser diode). In some embodiments, each of optical emitters 116 of the light source 114 is configured to produce a substantially monochromatic light 122 having a narrowband spectrum denoted by a particular color. In particular, the color of the monochromatic light 122 provided by an optical emitter 116 may be a primary color of a particular color space or color model (e.g., an RGB color model). In some embodiments, the plurality of optical emitters 116 may provide light 122 having one color, i.e., the color of the light 122 from each of the optical emitters 116 (e.g., optical emitters 116*a*, 116*b*, 116*c*) of the optical emitter plurality may be the same. Alternatively, as described further below with reference to FIG. 5, the optical emitters 116 at different longitudinal offsets 118 may produce light 122 of different colors, i.e., the color of the light 122 from the optical emitters 116 at the different longitudinal offsets 118 may be different. Thus, the light source 114 may comprise a plurality of different optical emitters 116 configured to provide different colors of light. Moreover, the different optical emitters 116 may be configured to provide light 122 having different, color-specific, propagation angles 120 of the collimated guided light beams 112 corresponding to each of the different colors of light.

As is previously mentioned, the light guide 110 is configured to guide the collimated guided light beam 112 according to total internal reflection at the propagation angle 120 between a first surface 136' (e.g., 'front' surface or side) and a second surface 136" (e.g., 'back' surface or side) of the light guide 110. In particular, the collimated guided light beam 112 propagates by reflecting or 'bouncing' zero or more times between the first surface 136' and the second surface 136" of the light guide 110 at the propagation angle 120.

As defined herein, a 'propagation angle' (such as propagation angle 120) is an angle relative to a surface (e.g., the first surface 136' or the second surface 136") of the light guide 110. Further, the propagation angle is a 'non-zero angle' that is both greater than zero and less than a critical angle of total internal reflection within the light guide 110, by definition herein. For example, the propagation angle 120 of the collimated guided light beam 112 may be between about ten (10) degrees and about fifty (50) degrees or, in some examples, between about twenty (20) degrees and about forty (40) degrees, or between about twenty-five (25) degrees and about thirty-five (35) degrees. For example, a propagation angle may be about thirty (30) degrees. In other examples, a propagation angle may be about 20 degrees, or about 25 degrees, or about 35 degrees. Moreover, a specific propagation angle may be chosen (e.g., arbitrarily) for a particular implementation as long as the specific propagation angle is chosen to be less than the critical angle of total internal reflection within the light guide 110.

As illustrated in FIGS. 3A-3C, the multiview display 100 further comprises an array of diffraction gratings 128. The array of diffraction gratings 128 is configured to scatter our a portion of the collimated guided light beam 112 as a plurality of directional light beams 130 representing a multiview image 132. According to various embodiments, a direction of the multiview image 132 is a function of both color and the propagation angle of the collimated guided light beam 112. For ease of illustration, FIGS. 3A and 3C depict a set of directional light beams 130 of the plurality of directional light beams 130 associated with a particular multiview image 132 as a block arrow having a direction 134. For example, FIG. 3A illustrates three sets of directional light beams 130*a*, 130*b*, 130*c*, each of which corresponds to a respective one of three illustrated multiview images 132*a*, 132*b*, 132*c* having directions 134*a*, 134*b*, 134*c*, respectively. Hence, the direction 134 of the set of directional light beams 130 is also the direction of a corresponding multiview image 132, by definition and as illustrated.

In some embodiments, the array of diffraction gratings 128 may be located on the first surface 136' of the light guide 110, e.g., as illustrated in FIGS. 3A-3C. In other embodiments (not illustrated), the array of diffraction gratings 128 may be located on the second surface 136". In yet other embodiments (not illustrated), diffraction gratings 128 of the diffraction grating array may be located between the first and second surfaces 136', 136", on both of the first and second surfaces 136', 136", or even distributed among various combinations of the first surface 136', the second surface 136", and between the first and second surfaces 136', 136". For example, the array of diffraction gratings 128 may be located on a surface of the light guide opposite to an emission surface of the light guide 110 through which the portion of the collimated guided light beam 112 is scattered out as the plurality of directional light beams 130. In some embodiments, diffraction gratings 128 of the diffraction grating array generally do not intersect, overlap or otherwise touch one another, according to some embodiments. That is, each diffraction grating 128 is generally distinct and separated from other ones of the diffraction gratings 128 in the diffraction grating array.

In particular, the diffraction grating array comprises individual diffraction gratings 128, such as diffraction gratings 128*a* and 128*b*, according to various embodiments. The individual diffraction gratings 128 are configured to scatter our light to provide or emit different ones of the directional light beams 130 in the various sets (such as the sets of directional light beams 130*a*, 130*b* and 130*c*) representing the various multiview images 132 (such as multiview images 132*a*, 132*b* and 132*c*), as illustrated in FIG. 3A. Note that each of the multiview images 132 has an associated one of the directions 134 (such as the directions 134*a*, 134*b* and 134*c*). The direction 134 may correspond to a particular view direction (e.g., a central view direction) of a view in the multiview image 132. Other views in the multiview image 132 may have view directions that are relative to the central view direction (e.g., the direction 134).

For example, the directional light beams 130*a* emitted by a particular set of diffraction gratings 128 of the array of diffraction gratings 128 may create or represent the multiview image 132*a* illustrated in FIG. 3A. The multiview image 132*a* may have a direction 134*a* and include a plurality of views $v_1, v_2 \ldots v_n$. Further, the multiview image 132*a* may have a central view having a view direction (e.g., a central view direction) corresponding to the direction 134*a*. Each of the other views (e.g., views $v_1, v_2 \ldots v_n$ excluding the central view) have other view directions that are relative to the view direction of the central view and also the direction 134a. Similarly, other sets of directional light beams 130b, 130c represent other multiview images 132b, 132c having central views and other views $v_1, v_2 \ldots v_n$ with central view directions corresponding to the directions 134b, 134c, as illustrated.

According to various embodiments, a diffraction grating 128 of the diffraction grating array is configured to provide a directional light beam 130 of the plurality of directional light beams 130 having an intensity and a principal angular direction corresponding to an intensity and a view direction of a view pixel of the multiview image 132. In particular, each diffraction grating 128 may be configured to provide a single directional light beam 130 representing a single view pixel in a view of the multiview image 132. Further, a grating characteristic of the diffraction grating 128 is configured to determine the intensity and the principal angular direction (e.g., direction 134). In various embodiments, the grating characteristic configured to determine principal angular direction may comprise one or both of a grating pitch of the diffraction grating 128 and a grating orientation of the diffraction grating 128. Further, the grating characteristic configured to determine the intensity may comprises a grating depth of the diffraction grating, in some embodiments. In some embodiments, a diffraction-grating coupling efficiency (such as the diffraction-grating area, the groove depth or ridge height, etc.) is configured to increase as a function of the distance from the input end 126. The increase may be configured to correct for a decrease in the intensity of the collimated guided light beams 112 as a function of the distance. Thus, an intensity of the directional light beam 130 provided by the diffraction gratings 128 and corresponding to an intensity of a corresponding view pixel may be determined, in part, by a diffractive coupling efficiency of the diffraction grating 128.

In some embodiments (as illustrated in FIGS. 3A-3C), the static multiview display 100 further comprises a collimating light coupler 124. In particular, the collimating light coupler is located at the input end 126 of the light guide 110 between the light source 114 and the light guide 110, as illustrated. The collimating light coupler 124 is configured to optical couple the light 122 from the light source 114 into the light guide 110 as the collimated guided light beam 112. Further, the longitudinal offset 118 of the optical emitter 116 is a location of the optical emitter 116 in the longitudinal direction relative to the collimating light coupler 124. In some embodiments, the collimating light coupler 124 comprises a cylindrical grating coupler, the light source being located adjacent to a guiding surface of the light guide and optical emitters of the light source being configured to emit light through the guiding surface. In other embodiments, the collimating light coupler 124 comprises another type of collimator including, but not limited to, a light coupler comprising a parabolic or shaped parabolic reflector. Several embodiments of collimating light couplers 124 are described below with reference to FIGS. 7A-7C (cylindrical grating coupler) and FIGS. 8A-8B (reflective light coupler).

In some embodiments, the static multiview display 100 may be configured to animate a multiview image. In particular, the static multiview display 100 may be a quasi-static multiview display configured to provide a plurality of different multiview images in similar a plurality different directions. The different multiview images having different directions of the plurality of different multiview images may be displayed according to a time sequence to provide multiview image animation. For example, as described above with respect to FIG. 3A, the plurality of optical emitters 116 of the light source 114 may comprises the first optical emitter 116a having the first longitudinal offset 118a configured to provide the first collimated guided light beam 112a at the first propagation angle 120a and the second optical emitter 116b having the second longitudinal offset 118b configured to provide a second collimated guided light beam 112b at the second propagation angle 120b within the light guide 110. The first propagation angle 120a may be configured to provide a first multiview image 132a having a first direction 134a and the second propagation angle 120b may be configured to provide a second multiview image 132b having a second direction 134b. Selective activation of the first and second optical emitters 116a, 116b may be employed to provide switching between the first multiview image 132a in the first direction 134a and the second multiview image 132b in the second direction 134b to animate the multiview image.

FIG. 4A illustrates a cross-sectional view of a static multiview display 100 in an example, according to an embodiment consistent with the principles described herein. FIG. 4B illustrates a cross-sectional view of a static multiview display 100 in an example, according to an embodiment consistent with the principles described herein. FIG. 4C illustrates a cross-sectional view of a static multiview display 100 in an example, according to an embodiment consistent with the principles described herein. The static multiview display 100 illustrated in FIGS. 4A-4C may be substantially similar to that illustrated in FIGS. 3A-3C. In particular, the static multiview display 100 comprises a light guide 110, a light source 114 comprising optical emitters 116, a collimating light coupler 124, and an array of diffraction gratings 128.

As illustrated in FIGS. 4A-4C, optical emitters 116 in the light source 114 (such as optical emitters 116a, 116b and 116c) have different longitudinal offsets 118 (such as longitudinal offsets 118a, 118b, 118c). Light 122 emitted by these optical emitters 116 may result in directional light beams 130 (such as directional light beams 130a, 130b, 130c) having different directions 134 (such as directions 134a, 134b, 134c) and, thus, in different multiview images 132 (such as multiview images 132a, 132b, 132c) having different central view directions. For example, optical emitters 116a, 116b and 116c may have the same color but, because of the different longitudinal offsets 118a, 118b, 118c, the corresponding collimated guided light beams 112a, 112b, 112c may have different propagation angles 120a, 120b, 120c, respectively. As such, the result is the different multiview images 132a, 132b, 132c having different directions 134a, 134b, 134c, as illustrated in FIGS. 4A-4C. In particular, as shown in FIGS. 4A-4C, optical emitters 116a, 116b and 116c may be selectively illuminated as a function of time or according to a time sequence, which results in animation (such as a time sequenced 3D animation) as the static multiview display 100 switches among the different multiview images 132a, 132b, 132c with the corresponding different directions 134. Further, by sequentially illuminating the optical emitters 116 during different sequential time intervals or periods, the static multiview display 100 may shift an apparent location of the various multiview images 132 during the different time periods. Thus, in some embodiments, the static multiview display 100 is operated as a quasi-static multiview display.

In another example, the first optical emitter 116a may be configured to provide the first collimated guided light beam 112a having a first color and the second optical emitter 116b may be configured to provide the second collimated guided light beam 112b having a second color. The first and second longitudinal offsets 118a, 118b may be selected to provide a composite multiview image comprising a combination of a first multiview image 132a provided by the first collimated guided light beam 112a and a second multiview image 132b provided by the second collimated guided light beam 112b. The composite multiview image may have a color representing a combination of the first and second colors and a relative illumination intensity of the first and second optical emitters 116a, 116b, for example.

FIG. 5 illustrates a cross-sectional view of a multiview display 100 in an example, according to an embodiment consistent with the principles described herein. The static multiview display 100 illustrated in FIG. 5 may be substantially similar to that illustrated in FIGS. 3A-3C. In particular, the static multiview display 100 comprises a light guide 110, a light source 114 comprising optical emitters 116, a collimating light coupler 124, and an array of diffraction gratings 128.

Further, as illustrated in FIG. 5, different optical emitters 116 in the light source 114 (such as optical emitters 116a, 116b and 116c) have different longitudinal offsets 118a, 118b, 118c and different colors from one another. For example, the first optical emitter 116a may provide red light 122, the second optical emitter 116b may provide green light 122, and the third optical emitter 116c may provide blue light 122. The different longitudinal offsets 118a, 118b, 118c may be selected so that the propagation angles 120 of the collimated guided light beams 112 result in directional light beams 130 corresponding to the collimated guided light beams 112 having the same principal angular directions. That is, the optical emitters 116 may be configured to provide light 122 having different, color-specific, propagation angles 120 of the collimated guided light beams 112 corresponding to each of the different colors of light. In this way, multiview image 132 is a composite multiview image 132d representing a combination of a first multiview image provided by the collimated guided light beam 112a, a second multiview image provided by the collimated guided light beam 112b, and a third multiview image provided by the collimated guided light beam 112c. Each of the first, second and third multiview images have the same direction 134, but a different color. The composite multiview image 132d, in turn, may have a color representing a combination of the colors and relative illumination intensities of the optical emitters 116a, 116b and 116c. In FIG. 5, the red, green and blue directional light beams 130 (illustrated with dashed, solid and dotted lines) are shown as block arrows slightly offset from one another for clarity. In some embodiments, the color of the composite image is white. More generally, the different intensities of optical emitters 116 may determine a color of the composite multiview image. Further, while the preceding example illustrates optical emitters 116 that provide three colors (e.g., red, green and blue), in other embodiments there may be more or fewer optical emitters at different longitudinal offsets 118 providing more or fewer colors.

FIG. 6A illustrates a top view of a diffraction grating 128 in an example, according to an embodiment consistent with the principles described herein. FIG. 6B illustrates a top view of a plurality of diffraction gratings 128 in an example, according to another embodiment consistent with the principles described herein. In particular, FIGS. 6A and 6B illustrate diffraction gratings 128 that may be in the array of diffraction gratings 128 described above with respect to the static multiview display 100. As such, the illustrated diffraction gratings 128 in FIGS. 6A-6B are configured to diffractively scatter out a portion of the collimated guided light beams 112 as a directional light beam in the plurality of directional light beams 130, according to various embodiments.

As illustrated, the diffraction grating 128 comprises a plurality of diffractive features spaced apart from one another by a diffractive feature spacing (which is sometimes referred to as a 'grating spacing') or a diffractive feature or grating pitch configured to provide diffractive scatter out of the guided light portion. According to various embodiments, the spacing or grating pitch of the diffractive features in the diffraction grating 128 may be sub-wavelength (i.e., less than a wavelength of the collimated guided light beams 112). Note that, FIGS. 6A and 6B illustrate the diffraction gratings 128 having a single grating spacing (i.e., a constant grating pitch), for simplicity of illustration. However, as described below, the diffraction grating 128 may include a plurality of different grating spacings (e.g., two or more grating spacings) or a variable grating spacing or pitch to provide the direction light beams 130. Consequently, FIGS. 6A and 6B do not imply that a single grating pitch is an embodiment of diffraction grating 128.

According to some embodiments, the diffractive features of the diffraction grating 128 may comprise one or both of grooves and ridges that are spaced apart from one another. The grooves or the ridges may comprise a material of the light guide 110, e.g., may be formed in a surface of the light guide 110. In another example, the grooves or the ridges may be formed from a material other than the light guide material, e.g., a film or a layer of another material on a surface of the light guide 110.

As discussed previously and shown in FIG. 6A, the configuration of the diffraction features comprises a grating characteristic of the diffraction grating 128. For example, a grating depth of the diffraction grating may be configured to determine the intensity of the directional light beam provided by the diffraction grating 128. Additionally and further shown in FIGS. 6A-6B, the grating characteristic may comprise one or both of a grating pitch of the diffraction grating 128 and a grating orientation y of the diffraction grating 128. In particular, FIG. 6A illustrates the grating orientation y that may be an angle relative to the propagation direction. Further, FIG. 6B illustrates a plurality of diffraction gratings 128 having several different grating orientations. In conjunction with the angle of incidence of the collimated guided light beams 112 (i.e., the propagation angles 120), these grating characteristics determine the principal angular direction of the directional light beams 130 provided by the diffraction grating 128.

In some embodiments (not illustrated), the diffraction grating 128 configured to provide the directional light beams 130 is or comprises a variable or chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multiview display 100 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed. In some embodiments (not illustrated), the diffraction grating 128 may comprise a plurality of sub-gratings. In some embodiments, individual sub-gratings of the plurality of sub-gratings may be superimposed on one another. In other embodiments, the sub-gratings may be separate diffraction gratings arranged next to one another, e.g., as an array, to form the diffraction grating 128.

As noted previously, in some embodiments the collimating light coupler 124 of the static multiview display 100 may comprise a cylindrical grating coupler. FIG. 7A illustrates a cross-sectional view of a portion of a light guide 710 of a static multiview display 700, including a collimating light coupler 724 comprising a cylindrical grating coupler 138 in an example, according to an embodiment consistent with the principles described herein. FIG. 7B illustrates a cross-sectional view of a portion of a light guide 710' of a static multiview display 700', including a collimating light coupler 724' comprising a cylindrical grating coupler 138 in an example, according to another embodiment consistent with the principles described herein. FIG. 7C illustrates a perspective view of the collimating light coupler 724' of FIG. 7B in an example, according to an embodiment consistent with the principles described herein. In particular, FIG. 7A illustrates a cut-away portion of the static multiview display 700 in a vicinity of the input end 126 of the light guide 710. In addition, FIGS. 7B and 7C illustrate a cut-away portion of the static multiview display 700' in a vicinity of the input end 126 of the light guide 710'. Various dashed lines are used in FIGS. 7A-7B to delineate the collimated guided light beams 112 and light 122 provided by the light source 714 (FIG. 7A), 714' (FIG. 7B). FIG. 7C further illustrates the array of diffraction gratings 128 (omitted from FIGS. 7A-7B for ease of illustration).

In FIG. 7A, the cylindrical grating coupler 138 of the collimating light coupler 724 is configured to couple light 122 into the light guide 710 of the static multiview display 700 as the collimated guided light beams 112. The light 122 may be provided by a light source 714 (e.g., a substantially uncollimated light source), for example. In FIGS. 7B and 7C, the cylindrical grating coupler 138 of the collimating light coupler 724' is configured to couple light 122 into the light guide 710' of the static multiview display 700' as the collimated guided light beams 112. The light 122 may be provided by a light source 714' (e.g. e.g., a substantially uncollimated light source), for example. According to various embodiments, the cylindrical grating coupler 138 of the collimating light coupler 724 (FIG. 7A) or 724' (FIGS. 7B and 7C) may provide a relatively high coupling efficiency. Moreover, the cylindrical grating coupler 138 may transform the light 122 into collimated guided light beams 112 (e.g., beams of guided light) having a predetermined collimation factor within the light guide 710 (FIG. 7A) or 710' (FIGS. 7B and 7C), according to various embodiments.

According to various examples, the predetermined collimation factor provided by the cylindrical grating coupler 138 of the collimating light coupler 724 or 724' within the light guide 710 or 710' may result in the collimated guided light beam 112 having controlled or predetermined propagation characteristics. In particular, the cylindrical grating coupler 138 of the collimating light coupler 724 or 724' may provide a controlled or predetermined collimation factor in a 'vertical' direction, i.e., in a plane perpendicular to a plane of a surface of the light guide 710 or 710'. Further, the light 122 may be received from the light source 714 or 714' at an angle that is substantially perpendicular to the light guide plane and then transformed into the collimated guided light beams 112 having propagation angles 120 within the light guide 710 or 710', e.g., a propagation angle consistent with or less than a critical angle of total internal reflection within the light guide 710 or 710'.

According to some embodiments, the cylindrical grating coupler 138 may be or comprise a transmission-mode diffraction grating, while the cylindrical grating coupler 138 may be or comprise a reflection-mode diffraction grating, in other embodiments. In particular, as illustrated in FIG. 7A, the cylindrical grating coupler 138 comprises a transmission-mode diffraction grating at a surface of the light guide 710 adjacent to the light source 714. For example, the transmission-mode diffraction grating of the cylindrical grating coupler 138 may be on a bottom (or second) surface 136" of the light guide 710 and the light source 714 may illuminate the cylindrical grating coupler 138 from the bottom. As illustrated in FIG. 7A, the transmission-mode diffraction grating of the cylindrical grating coupler 138 is configured to diffractively redirect light 122 that is transmitted or passes through the transmission-mode diffraction grating. Shifting the relative location of the optical emitters 716 of the light source 714 along the longitudinal direction 108 provides the longitudinal offset of the optical emitters, which in turn changes the diffraction angle and, thus, the propagation angle 120 of the collimated guided light beam 112 within the light guide 710.

As illustrated in FIG. 7B, the cylindrical grating coupler 138 comprises a reflection-mode diffraction grating at a surface of the light guide 710' that is opposite to the surface adjacent to the light source 714'. For example, the reflection-mode diffraction grating of the cylindrical grating coupler 138 may be on a top (or first) surface 136' of the light guide 710' and the light source 714' may illuminate the cylindrical grating coupler 138 through a portion of the bottom (or second) surface 136" of the light guide 710'. The reflection-mode diffraction grating is configured to diffractively redirect light 122 into the light guide 710' using reflective diffraction (i.e., reflection and diffraction), as illustrated in FIG. 7B. Shifting the relative location of the optical emitters 716' of the light source 714' along the longitudinal direction 108 provides the longitudinal offset of the optical emitters, which in turn changes the diffraction angle and, thus, the propagation angle 120 of the collimated guided light beam 112 within the light guide 710'.

According to various examples, the both the transmission-mode diffraction grating and reflection-mode diffraction grating of the cylindrical grating coupler 138 may comprise grooves, ridges or similar diffractive features formed or otherwise provided on or in the surface 136' or 136" of the light guide 710 or 710'. For example, grooves or ridges may be formed in or on the light source-adjacent surface 136" (e.g., bottom or second surface) of the light guide 710 or 710' to serve as the transmission-mode diffraction grating. Similarly, grooves or ridges may be formed or otherwise provided in or on the surface 136' of the light guide 710 or 710' opposite to the light source-adjacent surface 136" to serve as the reflection-mode diffraction grating, for example.

According to some embodiments, the cylindrical grating coupler 138 may include a grating material (e.g., a layer of grating material) on or in the light guide surface. In some embodiments, the grating material may be substantially similar to a material of the light guide 710 or 710', while the grating material may differ (e.g., have a different refractive index) from the light guide material, in other embodiments. In some embodiments, the grooves in the light guide surface may be filled with the grating material. For example, grooves of the diffraction grating of either the transmission-mode diffraction grating or the reflection-mode diffraction grating may be filled with a dielectric material (i.e., the grating material) that differs from a material of the light guide 710 or 710'. The grating material of the cylindrical grating coupler 138 may include silicon nitride, for example, while the light guide 710 or 710' may be glass, according to some examples. Other grating materials including, but not limited to, indium tin oxide (ITO) may also be used.

In some examples, the grating material of cylindrical grating coupler 138 comprising the reflection-mode diffraction grating may further comprise a reflective metal or similar reflect material. For example, the reflection-mode diffraction grating may be or include a layer of reflective metal such as, but not limited to, gold, silver, aluminum, copper and tin, to facilitate reflection by the reflection-mode diffraction grating. Note that the transmission-mode diffraction grating and reflection-mode diffraction grating of the cylindrical grating coupler 138 are uniform or at least substantially uniform along the y-direction, according to some embodiments. This is illustrated in FIG. 7C, which provides a perspective view of a reflection-mode diffraction grating of the cylindrical grating coupler 138.

In some embodiments, the cylindrical grating coupler 138 may further comprise a portion of the light guide 710 or 710'. In particular, the discussion above describes these embodiments. In other embodiments the cylindrical grating coupler 138 comprises another light guide that is separate from but optically coupled to input end 126 of the light guide 710 or 710'. However, the above discussion applies equally well to the use of another light guide instead of the portion of the light guide 710 or 710'.

While FIGS. 7A-7C illustrate the use of a diffractive grating-based cylindrical grating coupler 138, in other embodiments other types of light couplers may be employed as the collimating light coupler 724 or 724'. For example, FIG. 8A illustrates a portion of a light guide 810 of a static multiview display 800, including a cross-sectional view of a collimating light coupler 824 comprising a parabolic reflective coupler 140 in an example, according to an embodiment consistent with the principles described herein. FIG. 8B illustrates a perspective view of a collimating light coupler 824 comprising parabolic reflective coupler 140 in an example, according to an embodiment consistent with the principles described herein. As shown in FIG. 8B, the parabolic reflective coupler 140 may be uniform along the y-direction. As with the cylindrical grating coupler 138, a longitudinal offset of optical emitters 816 within the light source 814 is configured to provide different propagation angles of the collimated guided light beams 112 within the light guide 810 of the static multiview display 800.

In some embodiments, static multiview display 100 (or 700, 700', or 800) may be transparent or substantially transparent. In particular, the light guide 110 (or 710, 710', or 810) and the array of diffraction gratings 128 may allow light to pass through the static multiview display 100 (or 700, 700', or 800) in a direction that is orthogonal to both the first surface 136' and the second surface 136" of the light guide 110 (or 710, 710' or 810), in some embodiments. That is, the light guide 100 (or 700, 700', or 800) and the array of diffraction gratings 128 may be transparent to light propagating in a vertical direction orthogonal the longitudinal direction. Thus, the light guide 100 (or 700, 700' or 800) and the array of diffraction gratings 128 or more generally the static multiview display 100 (or 700, 700', or 800) may be transparent to light propagating a vertical direction orthogonal to the longitudinal direction 108, i.e., a general propagation direction of the collimated guided light beams 112. Further, the transparency may be facilitated, at least in part, by the substantially transparency of the diffraction gratings 128 as well as by a spacing therebetween.

In accordance with some embodiments of the principles described herein, a transparent static multiview display is provided. The transparent static multiview display is configured to emit a plurality of directional light beams representing a multiview image or a plurality of multiview images. In particular, the emitted directional light beams are preferentially directed toward a plurality of views of the multiview image(s) based on the grating characteristics of diffraction gratings in an array of diffraction gratings of the transparent static multiview display. Different ones of the directional light beams may correspond to individual view pixels of different 'views' associated with the multiview image, according to various examples. The different views may provide a 'glasses free' (e.g., autostereoscopic) representation of information in the multiview image(s) displayed by the multiview display, for example.

FIG. 9 illustrates a block diagram of a transparent static multiview display 200 in an example, according to an embodiment consistent with the principles described herein. According to various embodiments, the transparent static multiview display 200 is configured to display a multiview image 232 according to different views in different view directions. Further, the multiview image 232 has a direction. In particular, a plurality of directional light beams 202 emitted by the transparent static multiview display 200 are used to display the multiview image 232 and may correspond to pixels (i.e., view pixels) of the different views (e.g., $v_1, v_2 \ldots v_n$) of the multiview image 232. According to some embodiments, a plurality of multiview images 232 may be provided, each multiview image 232 of the multiview image plurality having an associated direction. The directional light beams 202 are collectively illustrated as a block arrow in FIG. 9 pointing in a direction of a corresponding multiview image 232 (e.g., 232a, 232b, 2323c) of the multiview image plurality. According to various embodiments, the transparent static multiview display 200 is transparent in a vertical direction orthogonal a longitudinal direction along a length thereof.

The transparent static multiview display 200 illustrated in FIG. 9 comprises an array of diffraction gratings 204. The diffraction gratings 204 of the diffraction grating array are configured to diffractively scatter out light from a collimated guided light beam within a light guide 206 to provide the plurality of directional light beams 202 representing the multiview image 232. In some embodiments, the array of diffraction gratings 204 is substantially similar to the array of diffraction gratings 128 described above with respect to the static multiview display 100. In particular, a diffraction grating 204 of the diffraction grating array may be configured to provide a directional light beam 202 of the directional light beam plurality having an intensity and a principal angular direction corresponding to an intensity and a view direction of a view pixel of the multiview image 232. According to some embodiments, a grating pitch and a grating orientation of the diffraction grating 204 may be configured to determine the principal angular direction of the directional light beam 202. Further, a grating depth of the diffraction grating 204 may be configured to determine the intensity of the directional light beam 202, according to some embodiments.

As illustrated in FIG. 9, the transparent static multiview display 200 further comprises a light source 214. The light source 214 comprises a plurality of optical emitters offset from one another in the longitudinal direction. According to various embodiments, an optical emitter of the light source 214 is configured to provide the collimated guided light beam having a propagation angle determined by an offset of the optical emitter in the longitudinal direction. According to some embodiments, the light source 214 may be substantially similar to the light source 114 of the above-described static multiview display 100. In particular, a direction of the multiview image 232 is a function of both a color and the propagation angle of the collimated guided light beam, according to various embodiments.

The transparent static multiview display 200 illustrated in FIG. 9 further comprises the light guide 206 and a collimating light coupler 210. In particular, the collimating light coupler 210 may be located at an input of the light guide 206. The collimating light coupler 210 is configured to couple light 212 from the optical emitter of the light source 214 into the light guide input as the collimated guided light beam. The offset of the optical emitter is a location of the optical emitter in the longitudinal direction relative to the collimating light coupler 210. Arrows 208 in FIG. 9 represent the coupling of the collimated guided light beam into the light guide 206 by the collimating light coupler 210. Further, a propagation direction of the collimated guided light beam within the light guide 206 once coupled in defines the longitudinal direction, according to various embodiments.

According to some embodiments, a first optical emitter of light source 214 may have a first offset in the longitudinal direction configured to provide a first collimated guided light beam at a first propagation angle. Further, a second optical emitter of the light source 214 may have a second offset in the longitudinal direction configured to provide a second collimated guided light beam at a second propagation angle within the light guide 206. According to various embodiments, the first propagation angle may be configured to provide the multiview image 232 in a first direction and the second propagation angle being configured to provide the multiview image 232 in a second direction.

With reference to FIG. 9, the multiview image 232 provided in the first direction may be represented by a multiview image 232a, while a multiview image 232b may represent a multiview image 232 in the second direction, for example. A multiview image 232c may represent a multiview image 232c in a third direction, for example. Collectively, the multiview images 232a, 232b, 232c may be substantially similar to the multiview images 132a, 132b, 132c, described above with reference to FIGS. 3A-4C, according to some embodiments. For example, sequential and selective illumination of different optical emitters at different offsets may provide animation or apparent movement of the multiview images 132a, 132b, 132c, as a function of time, such that the transparent static multiview display 200 functions as a quasi-static multiview display.

According to some embodiments, a first optical emitter of light source 214 may be configured to provide light of a first color and a second optical emitter of the light source 214 may be configured to provide light of a second color. Further, the first and second optical emitters may have offsets configured to provide a composite multiview image (not illustrated) comprising a combination of the first and second colors. For example, the composite multiview image comprising the color combination provided by the transparent static multiview display 200 may be substantially similar to the composite multiview image 132d provided by the static multiview display 100, as described above with respect to FIG. 5.

In accordance with other embodiments of the principles described herein, a method of static multiview display operation is provided. FIG. 10 illustrates a flow chart of a method 300 of static multiview display operation in an example, according to an embodiment consistent with the principles described herein. As illustrated in FIG. 10, the method 300 of static multiview display operation comprises providing 310 light having a color using an optical emitter of a plurality of optical emitters, optical emitters of the optical emitter plurality being offset from one another in a longitudinal direction. According to some embodiments, the plurality of optical emitters may be substantially similar to the plurality of optical emitters 116 of the light source 114, described above with respect to the static multiview display 100. Moreover the provided 310 light may be substantially similar to the light 122, also described above.

The method 300 of static multiview display operation illustrated in FIG. 10 further comprises coupling 320 the light into a light guide as collimated guided light beams using a collimating light coupler. According to various embodiments, the collimated guided light beams have propagation angles determined by longitudinal offsets of the optical emitters. According to some embodiments, the collimating light coupler may be substantially similar to the collimating light coupler 124 of the above-described static multiview display 100. For example, the collimating light coupler may comprise any of a variety of collimating light couplers including, but not limited to, a cylindrical grating coupler.

Further, as illustrated, the method 300 of static multiview display operation comprises scattering out 330 a portion of the collimated guided light beam using an array of diffraction gratings to provide a plurality of directional light beams representing a multiview image. A direction of the multiview image is a function of both the color and the propagation angle of the collimated guided light beam, according to various embodiments. In some embodiments, the array of diffraction gratings may be substantially similar to the array of diffraction gratings 128 of the static multiview display 100, described above.

In particular, according to some embodiments, a diffraction grating of the diffraction grating array scatters out 330 the portion of the collimated guided light beam as a directional light beam of the plurality of directional light beams having an intensity and a principal angular direction corresponding to an intensity and a view direction of a view pixel of the multiview image. Further, a grating pitch and a grating orientation of the diffraction grating may be configured to determine the principal angular direction of the directional light beam. Similarly, a grating depth of the diffraction grating may be configured to determine the intensity of the directional light beam, according to some embodiments.

In some embodiments, the static multiview display comprising the light guide, the collimating light coupler, and the array of diffraction gratings is transparent to light propagating in a vertical direction orthogonal the longitudinal direction. For example, the static multiview display may be substantially similar to the transparent static multiview display 200, described above. As such, the method 300 of static multiview display operation may be a method of operating a transparent static multiview display.

In some embodiments (not illustrated), the method 300 of static multiview display operation may further comprise generating a first multiview image in a first direction by providing light using a first optical emitter of the optical emitter plurality, the first optical emitter having a first longitudinal offset. Additionally, the method 300 of static multiview display operation may comprise generating a second multiview image in a second direction by providing light using a second optical emitter of the optical emitter plurality, the second optical emitter having a second longitudinal offset. Generating the first and second multiview images, for example in a time-sequential manner, may enable the static multiview display to provide animation of the multiview images, for example. As such, the method 300 of static multiview operation may provide quasi-static multiview display operation.

In some embodiments (not illustrated), the method 300 of static multiview display operation may further comprise generating a first multiview image by providing light having a first color using a first optical emitter of the optical emitter plurality, the first optical emitter having a first longitudinal offset. Also, the method 300 of static multiview display operation may further comprise generating a second multiview image by providing light having a second color using a second optical emitter of the optical emitter plurality, the second optical emitter having a second longitudinal offset. According to various embodiments, the first and second longitudinal offsets may be chosen to provide a composite multiview image comprising a combination of the first and second multiview images. A color of the composite image may be a combination of the first and second color, for example. In some embodiments, the composite multiview image may be substantially similar to the composite multiview image 134d provided by the static multiview display 100, described above with respect to FIG. 5.

Thus, there have been described examples and embodiments of a static multiview display and a method of static multiview display operation that employ diffraction gratings to provide directional light beams representing a multiview image. Further, a relative offset of an optical emitter in a light source provides a direction of multiview image. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A static multiview display comprising:
 a light guide configured to guide light in a longitudinal direction;
 a light source comprising a plurality of optical emitters offset from one another in the longitudinal direction and being optically coupled to the light guide, an optical emitter of the light source being configured to provide within the light guide a collimated guided light beam having a propagation angle determined by a longitudinal offset of the optical emitter; and
 an array of diffraction gratings configured to scatter out a portion of the collimated guided light beam as a plurality of directional light beams representing a multiview image, a direction of the multiview image being a function of both a color and the propagation angle of the collimated guided light beam, a diffraction grating of the diffraction grating array being configured to provide a directional light beam of the plurality of directional light beams, the directional light beam having an intensity determined by a grating depth of the respective diffraction grating, at least two diffraction gratings of the diffraction grating array having different depths such that at least two directional light beams of the plurality of directional light beams have different intensities.

2. The static multiview display of claim 1, wherein the directional light beam has a principal angular direction determined by at least one of a grating pitch of the diffraction grating and a grating orientation of the diffraction grating.

3. The static multiview display of claim 1, wherein the array of diffraction gratings is located on a surface of the light guide opposite to an emission surface of the light guide through which the portion of the collimated guided light beam is scattered out as the plurality of directional light beams.

4. The static multiview display of claim 1, wherein the light guide and the array of diffraction gratings are transparent to light propagating in a direction orthogonal to an emission surface of the light guide.

5. The static multiview display of claim 1, further comprising a collimating light coupler at an input end of the light guide, the collimating light coupler being configured to optically couple light from the light source into the light guide as the collimated guided light beam, wherein the longitudinal offset of the optical emitter is a location of the optical emitter in the longitudinal direction relative to the collimating light coupler.

6. The static multiview display of claim 5, wherein the collimating light coupler comprises a cylindrical grating coupler, the light source being located adjacent to a guiding surface of the light guide and optical emitters of the light source being configured to emit light through the guiding surface.

7. The static multiview display of claim 1, wherein the plurality of optical emitters of the light source comprises a first optical emitter having a first longitudinal offset configured to provide a first collimated guided light beam at a first propagation angle and a second optical emitter having a second longitudinal offset configured to provide a second collimated guided light beam at a second propagation angle within the light guide.

8. The static multiview display of claim 7, wherein the first propagation angle is configured to provide a first multiview image having a first direction and the second propagation angle is configured to provide a second multiview image having a second direction, selective activation of the first and second optical emitters providing switching between the first multiview image in the first direction and the second multiview image in the second direction to animate the multiview image, the static multiview display being a quasi-static multiview display.

9. The static multiview display of claim 7, wherein the first optical emitter is configured to provide the first collimated guided light beam having a first color and the second optical emitter is configured to provide the second collimated guided light beam having a second color, the first and second longitudinal offsets being selected to provide a composite multiview image comprising a combination of a first multiview image provided by the first collimated guided light beam and a second multiview image provided by the second collimated guided light beam, and wherein the composite multiview image has a color representing a combination of the first and second colors and a relative illumination intensity of the first and second optical emitters.

10. A transparent static multiview display comprising:
 an array of diffraction gratings configured to diffractively scatter out light from a collimated guided light beam within a light guide to provide a plurality of directional light beams representing a multiview image, a diffraction grating of the diffraction grating array being configured to provide a directional light beam of the plurality of directional light beams, the directional light beam having an intensity determined by a grating depth of the respective diffraction grating, at least two diffraction gratings of the diffraction grating array having different depths such that at least two directional light beams of the plurality of directional light beams have different intensities; and a light source comprising a plurality of optical emitters offset from one another in a longitudinal direction, an optical emitter of the light source being configured to provide the collimated guided light beam having a propagation angle determined by an offset of the optical emitter in the longitudinal direction, wherein a direction of the multiview image is a function of both a color and the propagation angle of the collimated guided light beam, the transparent static multiview display being transparent in a direction orthogonal to an emission surface of the light guide.

11. The transparent static multiview display of claim 10, wherein a grating pitch and a grating orientation of the diffraction grating are configured to determine a principal angular direction of the directional light beam.

12. The transparent static multiview display of claim 10, further comprising a collimating light coupler at an input end of the light guide, the collimating light coupler being configured to optically couple light from the optical emitter of the light source into the light guide input as the collimated guided light beam, wherein the offset of the optical emitter is a location of the optical emitter in the longitudinal direction relative to the collimating light coupler.

13. The transparent static multiview display of claim 10, wherein a first optical emitter of light source has a first offset in the longitudinal direction configured to provide a first collimated guided light beam at a first propagation angle and a second optical emitter of the light source has a second offset in the longitudinal direction configured to provide a second collimated guided light beam at a second propagation angle within the light guide, the first propagation angle being configured to provide the multiview image in a first direction and the second propagation angle being configured to provide the multiview image in a second direction.

14. The transparent static multiview display of claim 10, wherein a first optical emitter of light source is configured to provide light of a first color and a second optical emitter of the light source is configured to provide light of a second color, the first and second optical emitters having offsets configured to provide a composite multiview image comprising a combination of the first and second colors.

15. A method of static multiview display operation, the method comprising:

providing light having a color using an optical emitter of a plurality of optical emitters, optical emitters of the optical emitter plurality being offset from one another in a longitudinal direction;

coupling the light into a light guide as collimated guided light beams using a collimating light coupler, the collimated guided light beams having propagation angles determined by longitudinal offsets of the optical emitters; and scattering out a portion of the collimated guided light beam using an array of diffraction gratings to provide a plurality of directional light beams representing a multiview image, a direction of the multiview image being a function of both the color and the propagation angle of the collimated guided light beam, the directional light beams having an intensity corresponding to an intensity of the multiview image, the intensity of the directional light beams being determined by respective grating depths of the respective diffraction gratings, at least two diffraction gratings of the diffraction grating array having different depths such that at least two directional light beams of the plurality of directional light beams have different intensities.

16. The method of static multiview display operation of claim 15, the directional light beams have principal angular directions determined by a grating pitch and a grating orientation of the respective diffraction grating.

17. The method of static multiview display operation of claim 15, wherein the static multiview display comprising the light guide, the collimating light coupler, and the array of diffraction gratings is transparent to light propagating in a direction orthogonal to an emission surface of the light guide.

18. The method of static multiview display operation of claim 15, further comprising:

generating a first multiview image in a first direction by providing light using a first optical emitter of the optical emitter plurality, the first optical emitter having a first longitudinal offset; and generating a second multiview image in a second direction by providing light using a second optical emitter of the optical emitter plurality, the second optical emitter having a second longitudinal offset.

19. The method of static multiview display operation of claim 15, further comprising:

generating a first multiview image by providing light having a first color using a first optical emitter of the optical emitter plurality, the first optical emitter having a first longitudinal offset; and generating a second multiview image by providing light having a second color using a second optical emitter of the optical emitter plurality, the second optical emitter having a second longitudinal offset, wherein the first and second longitudinal offsets are chosen to provide a composite multiview image comprising a combination of the first and second multiview images, a color of the composite image being a combination of the first and second color.

* * * * *